(12) United States Patent
Chen

(10) Patent No.: US 9,200,411 B2
(45) Date of Patent: Dec. 1, 2015

(54) MINERAL PAPER

(71) Applicant: New Millenium LLC, Rowland Heights, CA (US)

(72) Inventor: Lee Chen, Taipei (TW)

( * ) Notice: Subject to any disclaimer, the term of this patent is extended or adjusted under 35 U.S.C. 154(b) by 301 days.

(21) Appl. No.: 14/045,165

(22) Filed: Oct. 3, 2013

(65) Prior Publication Data

US 2015/0097310 A1   Apr. 9, 2015

(51) Int. Cl.
| | | |
|---|---|---|
| *D21H 13/00* | (2006.01) | |
| *D21H 13/36* | (2006.01) | |
| *D21H 27/00* | (2006.01) | |
| *B29K 105/26* | (2006.01) | |
| *B29L 31/00* | (2006.01) | |
| *B29C 49/00* | (2006.01) | |

(52) U.S. Cl.
CPC .............. *D21H 27/00* (2013.01); *D21H 13/36* (2013.01); *B29C 2049/001* (2013.01); *B29K 2105/26* (2013.01); *B29L 2031/76* (2013.01)

(58) Field of Classification Search
None
See application file for complete search history.

(56) References Cited

U.S. PATENT DOCUMENTS

| | | | | |
|---|---|---|---|---|
| 3,005,745 | A * | 10/1961 | Holmes ................ | D21H 17/34 162/152 |
| 4,912,067 | A * | 3/1990 | Garman ................ | D21H 13/44 162/152 |
| 5,126,013 | A * | 6/1992 | Wiker .................... | D21H 13/26 162/145 |
| 5,776,392 | A * | 7/1998 | Schmuck ............... | D21H 13/36 264/86 |
| 6,280,680 | B1 * | 8/2001 | Liang .................... | B29C 47/20 264/129 |
| 2004/0020410 | A1 * | 2/2004 | Gane .................... | D21H 19/385 106/464 |
| 2012/0196950 | A1 * | 8/2012 | Weismann ............. | C08J 5/18 523/100 |
| 2012/0211189 | A1 * | 8/2012 | Huang ................... | D21H 13/14 162/168.1 |

* cited by examiner

*Primary Examiner* — Mary F Theisen
(74) *Attorney, Agent, or Firm* — Clement Cheng

(57) ABSTRACT

A process to manufacture a paper derived from minerals includes the steps of preparing a mineral preparation that includes 50% to 70% of total dry weight of rocks that have been crushed and ground into a powdery substance; combining the mineral preparation with a sodium silicate solution of total dry weight of 30% to 50%; and adding additives having a weight of 2% to 5% of a total dry weight. The powdery substance may have granules of about 0.05 mm to 0.08 mm in diameter and can be mixed with vitamin powder. The igneous rocks can be selected from the set of: dolostone, basalt, granite, gabbro, andesite, diorite, obsidian, pegmatite, peridotite, pumice, rylolite, and scoria. Sedimentary rocks can be selected from the set of: limestone, sandstone, conglomerate, shale, siltstone, brecca, gypsum, chert, travertine, flint, iron ore, rock salt, and oil shale.

20 Claims, 3 Drawing Sheets

MINERAL PAPER

FIELD OF THE INVENTION

The present invention is in the field of mineral paper. More specifically, the present invention provides for a manufacturing process and composition of matter for making paper that is derived at least partially from rocks.

DISCUSSION OF RELATED ART

Paper has been made of many different compositions. Papyrus from which the name paper comes from was one of the original compositions from which paper was made. Historically, the manufacturing of paper has been completed through various methods using different compositions. One of the most common methods comes from a process using wood pulp. Wood pulp is made from tree sources like spruce, pine, fir, eucalyptus, birch, etc. Wood provides about 90% of the pulp production that is currently used for the manufacturing of today's paper. Also synthetic resins or plastics like HDPE, PP, PET, or PVC materials are processed or mixed with the wood pulp in the completion of the pulp paper. Most of these types of plastics or resins are petroleum-based.

More than 400 billion pounds of synthetic resins and plastics are produced each year in the U.S. alone, accounting for nearly 10% of total U.S. oil consumption. Such materials are desirable by retailers and consumers because they may be simply disposed of after use, and they do not need to be washed or reused.

The widespread and growing use of such disposable materials results in large amounts of litter being produced each day. Plastic refuse may either be incinerated or it may accumulate in landfills. More than 60 million plastic petroleum-based plastics end up in landfills every day. Since these plastics do not decay in soil, these methods of waste disposal have the potential to cause a variety of problems in the environment, such as long-term pollution of water sources like rivers and oceans.

Liang in U.S. Pat. No. 6,280,680 issued Aug. 28, 2001 provides for paper made from inorganic mineral powders entitled Process For The Manufacture Of Environmentally Friendly Papers And Compositions Therefor, the disclosure of which is incorporated herein by reference. Liang suggests using material such as Calcium Carbonate and HDPE Plastics. Weismann in United States patent publication 20120196950, published Aug. 2, 2012 entitled Biodegradable Polymer Composition With Calcium Carbonate And Methods And Products Using Same, suggests using calcium carbonate and PLA which is a resin made from starch such as corn, potatoes, or sugarcane, the disclosure of which is incorporated herein by reference.

One of the earlier inorganic papers was patented by Holmes as U.S. Pat. No. 3,005,745 issued Oct. 24, 1961 entitled Inorganic Papers and Methods of Making Same, the disclosure of which is incorporated herein by reference. Holmes suggests using silicon dioxide and aluminum ferrous oxide stabilized with a polymeric substance. Arledter working for the Mead Corporation patented U.S. Pat. No. 3,184,373 patented May 18, 1965, entitled Filled Paper Containing A Mixture Of Resin And Mucilaginous Material As A Retention Aid And Process For Producing Said Paper, the disclosure of which is incorporated herein by reference. Arledter suggested using a high percentage of titanium dioxide filler particles. An even earlier reference is Werner in U.S. Pat. No. 2,949,397 patented Aug. 16, 1960 entitled Mineral Filled Paper, the disclosure of which is incorporated herein by reference. Werner proposes a variety of different mineral filler particles in an aqueous colloidal dispersion.

SUMMARY OF THE INVENTION

While many mineral based papers have been proposed in the past, none of them seems have achieved widespread usage and adoption. An object of the present invention is to provide a more usable paper made of minerals to allow more widespread adoption of mineral-based paper for the ultimate goal of saving natural resources, especially tree harvesting and the related amount of plastics required to generate wood pulp and its products.

The present invention is a manufacturing process to make a paper that is derived from rock. This composite matter can be made up of 50% to 70% by weight of any three different rock types (Igneous, Sedimentary, and Metamorphic), a Sodium Silicate solution in weight of 30% to 50%, and a 2% to 5% by weight of required additives. The composite forms a final preparation composition that can be processed into a paper sheet material.

A process to manufacture a paper derived from minerals includes the steps of preparing a mineral preparation that includes 50% to 70% of total dry weight of rocks that have been crushed and ground into a powdery substance; combining the mineral preparation with a sodium silicate solution of total dry weight of 30% to 50%; and adding additives having a weight of 2% to 5% of a total dry weight. The powdery substance may have granules of about 0.05 mm to 0.08 mm in diameter and can be mixed with vitamin powder. The igneous rocks can be selected from the set of: dolostone, basalt, granite, gabbro, andesite, diorite, obsidian, pegmatite, peridotite, pumice, rylolite, and scoria. Sedimentary rocks can be selected from the set of limestone, sandstone, conglomerate, shale, siltstone, brecca, gypsum, chert, travertine, flint, iron ore, rock salt, and oil shale. Different metamorphic rocks can be selected from the set of: gneiss, marble, quartzite, slate, schist, serpentine, amphibolite, hornfels, novaculite, phyllite and soapstone.

Optionally, the powdery substance comprises concrete, asphalt, pavement or waste rock. The powdery substance optionally comprises recycled concrete, recycled asphalt, or recycled pavement. Additives may include both organic and inorganic compounds. The granules of rock, sodium silicate solution and additives are combined forming a molecular bond and processed into pellets. The pellets are created using one or more processes that include extrusion forming, injection molding, thermoforming, vacuum forming, injection molding, stretching, blow molding, extrusion, blow molding, and rotational molding. The process may include the step of melting the pellets and then stretching them into thin sheets with an average thickness of 0.14 mm. The process may include the step of cutting the sheets into various sizes.

Figure 1:
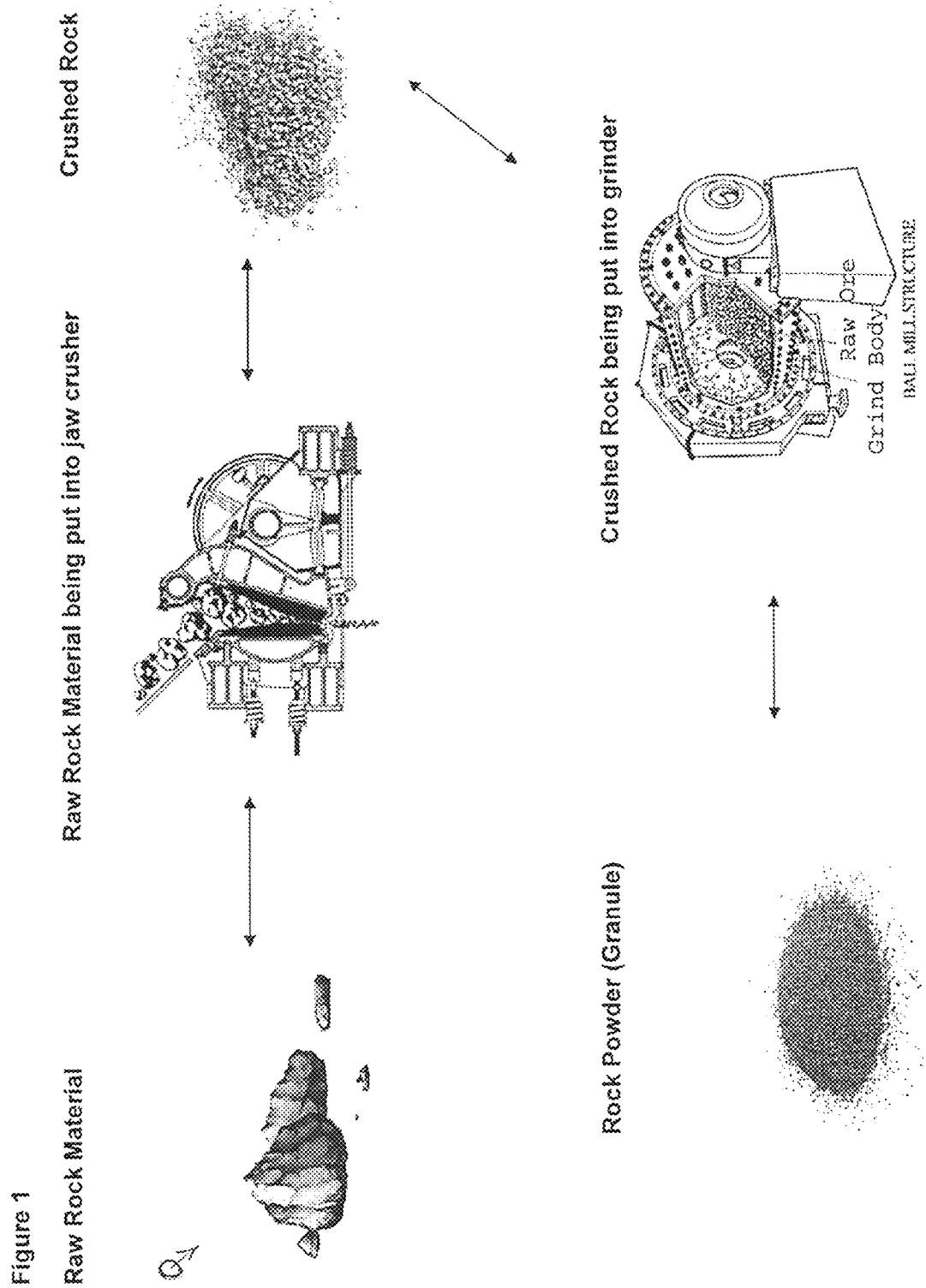
FIG. 1 is a flowchart diagram showing the main steps of manufacturing the rock paper.
Figure 2:
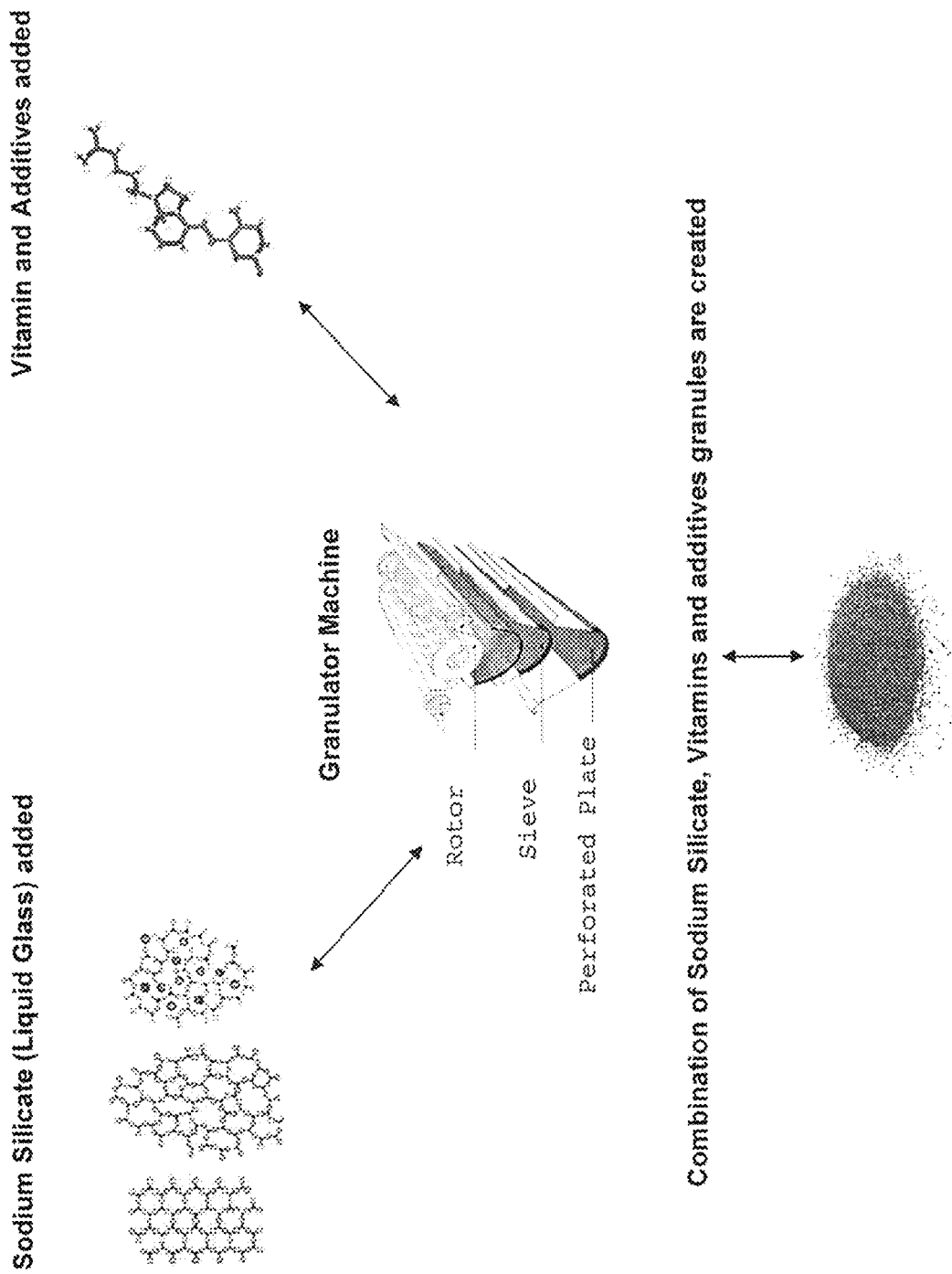
FIG. 2 is a second flowchart diagram showing main steps of manufacturing the rock paper.
Figure 3:
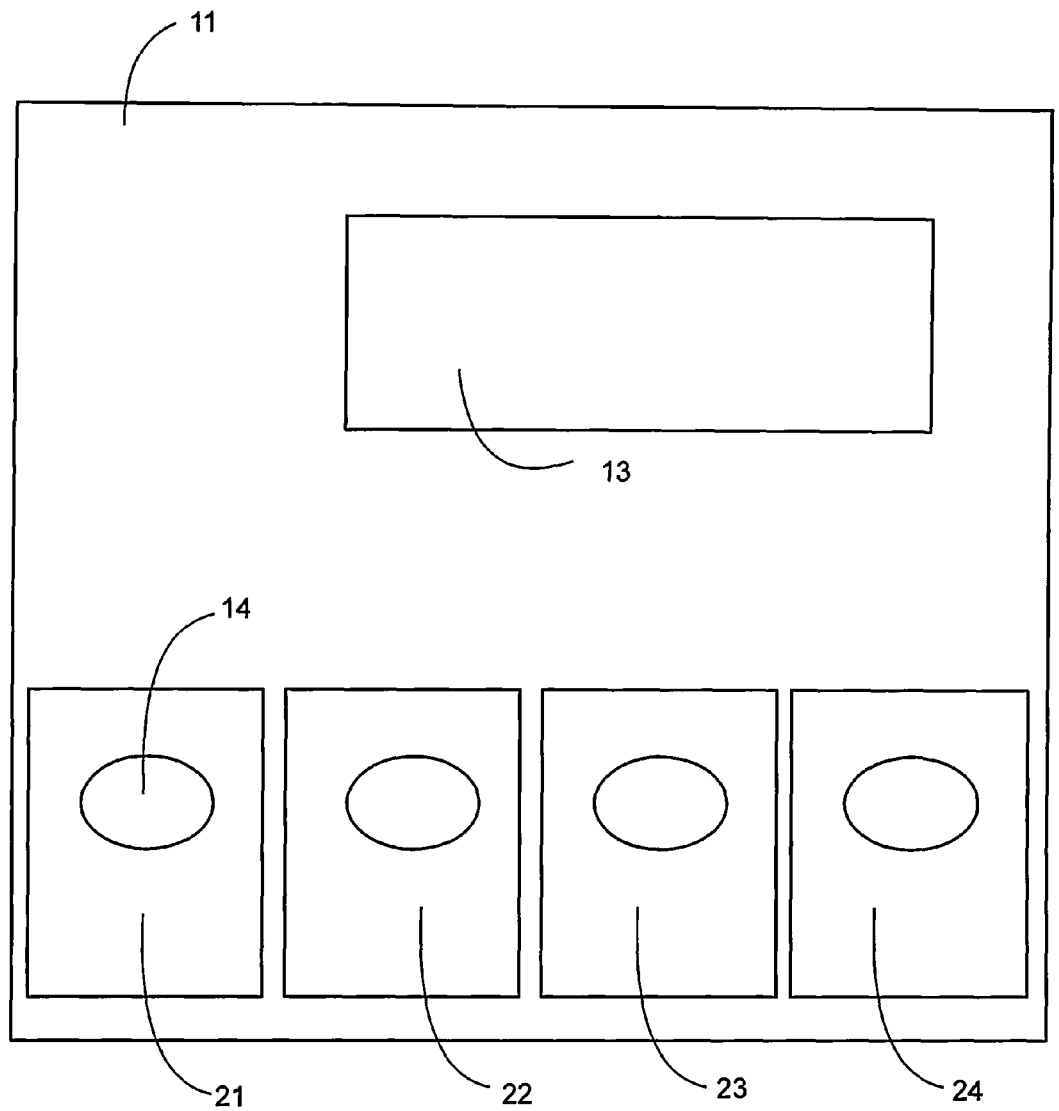
FIG. 3 is a diagram of a vitamin sheet paper with a tear off vitamin sheet.

11 Main Section
13 Instructions
14 Vitamin Embedded Portion
21 First Tear Off Section
22 Second Tear Off Section 23 Third Tear Off Section
24 Fourth Tear Off Section
31 Procuring Raw Material
32 Loading Rock Material Into A Jaw Crusher
33 Producing Crushed Rock
34 Loading Crushed Rock Into A Grinder
35 Producing Rock Powder Granules
36 Adding Sodium Silicate
37 Adding Vitamins And Additives
38 Loading The Mixture Into A Granulator Machine
39 Finally Producing A Combination Of Sodium Silicate, Vitamins And Additive In Granule Form Described herein are the compositions and manufacturing methods used in this manufacturing process.

DETAILED DESCRIPTION OF THE PREFERRED EMBODIMENTS

The invention relates to a manufacturing process and composition for paper and paper products that is derived from rocks. The composition is made up of 50% to 70% by weight of any of three different rock types (Igneous, Sedimentary, and Metamorphic), a Sodium Silicate solution in weight of 30% to 50%, and a 2% to 5% by weight of required additives.

The main steps of the process include procuring raw material 31, then loading rock material into a jaw crusher 32, then producing crushed rock 33, then loading crushed rock into a grinder 34, then producing rock powder granules 35, then adding sodium silicate 36, then adding vitamins and additives 37, then loading the mixture into a granulator machine 38, and finally producing a combination of sodium silicate, vitamins and additive in granule form 39. The granules are then processed into sheets or pellets. Some granules can be made without vitamins and granules can be made with vitamins. Granules made without vitamins can form a portion of a sheet of paper and then granules made with vitamins can form a smaller portion of that same sheet of paper.

Described herein are the compositions, methods for making these compositions, and applications using these compositions. In certain formulations, these compositions comprise a mixture of 50% to 70% in weight of rock, 30% to 50% in weight of Sodium Silicate solution, and 2% to 5% additives. When the desired end product is achieved, a mixture of rocks, a Sodium Silicate solution, and additives are combined by a specific formula that creates a molecular bond to the composition. Manufacturing processes such as melting, coating, stretching, laminating, and/or any other such suitable process may be used to create this end product.

An intermediate product such as a pellet may be formed by combining the mixture of rock that has been crushed or ground into a powdery substance, forming granulates that comprise 50% to 70% of the total weight of the composition. This includes a sodium silicate solution that comprises of 30% to 50% by weight and additives that comprise 2% to 5% by weight. The process involves the steps of mixing, extruding, or milling. For example, a method for making the composition into a paper film consists of using at least one extruder. The material composition may be melted in the extruder, molded, and cooled and stretched to the desired product thickness and consistency.

The material composition may be adjusted for specific end uses which could include similar properties of pulp paper products and may have comparable properties to such products, such as stiffness, opaqueness, foldability, ability to retain ink or graphite from writing utensils, and high or low tearing strength. The material composition may also be adjusted for use in applications such as signs, packaging, boxes, food containers, bags, labels, maps, books, newspapers and magazines, trays, credit cards and room keys, architectural drawings, decoration, wall coverings and other uses. An end product made from the composition may be water resistant and may be used for an application requiring waterproofing or water-repelling characteristics. Mineral papers can be combined with regular woodpulp papers in a book for example.

Additionally, an end product made from the composition may also be manufactured in single, double, triple, and/or additional layers depending on the desired end use. The layers may also be laminated to modify properties and uses. As an example, layers of the same material may be laminated on the composition; one or more different materials may be laminated on the composition.

A composition is described which comprises of 50% to 70% rock in weight, a Sodium Silicate solution which may comprise 30% to 50% by weight and 2% to 5% by weight of the total composition. The rock may be wet or dry ground. Some or all of the particles of the crushed or ground rock have a median particle size of 0.05 microns (or about 0.05 microns) or less and not greater than a median particle size of 0.08 microns (or about 0.08 microns). A printable sheet may be formed from the composition by standard papermaking techniques including the steps of rolling and drying.

The present invention describes a manufacturing process to make paper and its composition that is derived from rocks. Such materials may include rocks that are Igneous, Sedimentary, or Metamorphic.

Igneous type rocks include but are not limited to Dolostone, Basalt, Granite, Gabbro, Andesite, Diorite, Obsidian, Pegmatite, Peridotite, Pumice, Rylolite, and Scoria.

Sedimentary type rocks include but are not limited to Limestone, Sandstone, Conglomerate, Shale, Siltstone, Brecca, Gypsum, Chert, Travertine, Flint, Iron Ore, Rock Salt, and Oil Shale.

Metamorphic type rocks include but are not limited to Gneiss, Marble, Quartzite, Slate, Schist, Serpentine, Amphibolite, Hornfels, Novaculite, Phyllite and Soapstone.

Other material may include rocks that come from concrete, asphalt, pavement, and waste rocks. The manufacturing process according to the present invention comprises of a composition of 50% to 70% by weight of crushed or ground rock, a Sodium Silicate solution which is 30% to 50% in weight and 2% to 5% by weight of additives creating a molecular bond to end product. The process according to this present invention comprises of the following steps:

1. The raw rock material starts off by being placed into different types of crushers like a jaw crusher, cone crusher or compound crusher, which crushes the material into smaller pieces.
   a. The smaller pieces of rock are then put into a grinding machine like a ball mill, SAG bill or tower mill, which will create a powdery substance or granules that have a 0.05 mm to 0.08 mm particle size.
2. Sodium Silicate, Vitamin B powders and additives are added to a granulation machine to produce a granule with a particle size of 0.05 mm to 0.08 mm.
3. By desired weight, the rock granules and the granules formed from the Sodium Silicate, Vitamin B powders and additives are put into a pelletizing machine. This process combines the raw materials, forming them into a cylinder shape material that is mixed. Then, a thermal baking is performed, which allows the material to keep its hard shape and form a pellet that can be extruded and milled.

4. This pellet is placed in an extruder, where the pellet is pushed or drawn through a die. The extrusion may be continuous (creating indefinite long pieces) or semi-continuous (creating many pieces). This process is completed by heating the pellets typically in the range of 300° F. to 430° F., melting the pellets and then transported by force to said extruder and is loaded into a container and pushed into the desired die. Material is then molded into a paper film tube with a single passage way and a single inlet.
5. This material is now cooled to about 175° F. to 275° F. through a set of cooling rolls, ensuring the shape of paper film is maintained. This helps determine the proper thickness of the desired sheet.
6. The paper film tube is inflated and stretched vertically and horizontally resulting in the paper having a two-dimensional strength. During the process of the inflation, the density of this paper can be reduced from that of the combination of the raw materials about 2 g/cm$^3$ to about 0.5 g/cm$^3$, saving an amount of up to about 40% volume when compared with the density of pulp which is about 0.7 g/cm$^3$ to about 0.9 g/cm$^3$.

The paper is manufactured as a single-layered, double-layered or triple-layered type of paper.

During the manufacturing process of a single-layered type of paper from the present invention, a composition comprising about 50% to about 70% by weight of rock, about 30% to about 50% by weight of Sodium Silicate Solution, and about 2% to about 5% by weight of additives is used. During this process for a single-layered paper, the thickness of the paper can be suitably controlled within a range from about 30 µm to about 150 µm, the width can be about 0.2 m to about 3.2 m, and the density can be about 0.4 g/cm$^3$ to about 1 g/cm$^3$.

The present invention may also be utilized to produce to a double-layered paper. The difference between this process and the process for the manufacture of a single-layered paper is that the single inner passage and the single inlet are replaced by two inner passages and two inlets. The material passes through each inlet respectively and then meet in a smaller co passage way. The components of the two layers include about 50% to 70% by weight of rock, about 30% to 50% by weight of Sodium Silicate solution, and about 2% to 5% by weight of additives. A combination of the components is subjected to the steps of mixing, extruding, and milling, which creates granulates. These granulates are applied to the extruder.

The thickness of the double-layered paper ranges from about 30 µm to about 150 µm and the density ranges from about 0.4 g/cm$^3$ to about 1 g/cm$^3$. The relative thickness of these layers can be adjusted as required.

The present invention may also be applied to a process for the manufacture of a triple-layered paper. The difference between this process and the process for the manufacture of a single-layered paper is that the single inner passage and the single inlet are replaced by three inner passages and three inlets. The material passes through each inlet respectively and then meet in a smaller co passage way.

The components of the three layers include about 50% to 70% by weight of rock, about 30% to 50% by weight of Sodium Silicate solution, and about 2% to 5% by weight of additives. A combination of the components is subjected to the steps of mixing, extruding, and milling, which creates granulates. These granulates are applied to the extruder. The thickness of the triple-layered paper ranges from about 30 µm to about 150 µm and the density ranges from about 0.4 g/cm$^3$ to about 1 g/cm$^3$. The relative thickness of these layers can be adjusted as required.

Single-layered and multi-layered paper, each independently having a thickness in a range of about 30 µm to about 150 µm and independently having the same or different components, may be laminated to form a two-layered or three-layered laminated paper with a thickness range of about 150 µm to about 450 µm.

Vitamin B powder, or Inositol, can be embedded into paper and then absorbed into a user by sectioning the paper into small squares and then placing a sheet of paper underneath a tongue.

Alternatively, the paper can be made to be edible if other flavorings are added along with the vitamin powder. A variety of different vitamin supplements can be added such as Vitamin C or Vitamin D. The paper can be made into a tablet, pellet or sheet for delayed absorption after consumption. Environmental friendly papers of the present invention will now be further illustrated with reference to the following examples:

EXAMPLE 1

Single-Layered Environmentally-Friendly Paper

A single-layered environmentally-friendly paper is produced from a combination of 50% by weight of rock, 45% by weight of Sodium Silicate Solution, and 5% by weight of additives. This is subjected to mixing, extruding, and milling. The result is granules. These granules are fed into the extruder, and single-layered papers each having a thickness of 31 µm and 52 µm are produced.

EXAMPLE 2

Single-layered Environmentally-Friendly Paper

A single-layered paper is produced from a combination of 60% by weight of rock, 35% by weight of Sodium Silicate solution and 5% by weight of additives. After mixing, extruding, and milling, granules are created. The granules are fed into the extruder, and single-layered papers each having a thickness of 73 µm and 82 µm are produced.

EXAMPLE 3

Single-Layered Paper

A single-layered paper is produced from a combination of 70% by weight of rock, 25% by weight of Sodium Silicate solution, and 5% by weight of additives. The above combination is subjected to the steps of mixing, extruding, and milling, resulting in granulates. The granules are fed into the extruder and single-layered environmentally friendly papers each having a thickness of 102 µm and 116 µm are produced.

EXAMPLE 4

Double-Layered Paper

A Double-layered paper is composed of two layers. The layers are produced from a combination of 60% by weight of rock, 38% by weight of Sodium Silicate solution, and 2% by weight of additives. The combination is subjected to the steps of mixing, extruding, and milling, resulting in the first granulates. The combination then proceeds through the steps of mixing, extruding, and milling.

A double-layered paper having a thickness of 100 μm is produced.

EXAMPLE 5

Triple-Layered Paper

A triple-layered paper is composed of a laminate structure of three layers. The layers are produced from a combination of 60% by weight of rock, 38% by weight of Sodium Silicate solution, and 2% by weight of additives. The above combination is subjected to the steps of mixing, extruding, and milling and results in the first granules.

Some suitable processing methods for the biodegradable material composition include, but are not limited to: Plastics Extrusion: a biodegradable material composition is melted and formed into a continuous profile (for example, pipe/tubing, weather stripping, window frames, adhesive tape and wire insulation). Thermoforming: sheets of the biodegradable material composition are heated to a pliable forming temperature and formed to a specific shape in a mold, then trimmed to create a usable product. (This primarily produces disposable cups, containers, lids, trays, blisters, clamshells, and other products for the food, medical, and general retail industries).

Vacuum Forming: may be used for parts that are shallow in depth or where wall thickness is not critical to the function of the part (transparent materials, unit doses of pharmaceuticals, or protective covers, for example). Blow Molding: hot biodegradable material composition resin is pressurized into mold cavities, cooled and hardened, then ejected from the mold. (This method may provide a wide variety of industrial or technical applications, such as toy wheels, automobile seat backs, ductwork, surf boards, bellows, fuel tanks, flower pots, automobile bumpers, double-walled tool cases, and cabinet panels). Rotational Molding: similar to blow molding, however, molds are slowly rotated into place continuously while cooling. (Products derived from this method may include storage tanks, bins and refuse containers, doll parts, road cones, footballs, helmets, rowing boats and kayak hulls, playground slides, and roofs).

A section of a sheet of the paper can be rock paper and another section of the sheet of paper can be rock paper embedded with vitamins. The vitamin embedded section can be scored with a tear off section for consumption. In this way, instructions or dietary information can be printed on a primary section of the sheet of paper and the portion to be consumed can be printed on a tear off section of the sheet of paper.

The main section 11 can be connected to the tear off section. The instructions 13 can be printed on the main section 11. The vitamin embedded portion 14 can be oval shaped and can be on the tear off section 21, 22, 23, 24. There can be multiple tear off sections, such as a first tear off section 21, a second tear off section 22, a third tear off section 23 and a fourth tear off section 24.

This description of the invention includes preferred forms. Modifications may be made without departing from the original scope of the invention. The disclosures and descriptions herein are purely illustrative and are not intended to be in any sense limiting. For example, the shape of the primary section of the sheet of paper can be made as a long strip with multiple tear off vitamin sheets, one corresponding to each day of the week and with the instructions printed as a graphical calendar.

The invention claimed is:

1. A process to manufacture a paper derived from minerals comprising the steps of:

a. preparing a mineral preparation that includes 50% to 70% of total dry weight of rocks that have been crushed and ground into a powdery substance;

b. combining the mineral preparation with a sodium silicate solution of total dry weight of 30% to 50%;

c. adding additives having a weight of 2% to 5% of a total dry weight to form a final preparation composition;

d. processing the final preparation composition into a paper sheet material.

2. The process of claim 1, wherein the poisidery substance has granules of about 0.05 mm to 0.08 mm in diameter.

3. The process of claim 2, wherein igneous rocks are selected from the set of: dolostone, basalt, granite, gabbro, andesite, diorite, obsidian, pegmatite, peridotite, pumice, rylolite, and scoria.

4. The process of claim 2, wherein sedimentary rocks are selected from the set of: limestone, sandstone, conglomerate, shale, siltstone, brecca, gypsum, chert, travertine, flint, iron ore, rock salt, and oil shale.

5. The process of claim 2, wherein different metamorphic rocks are selected from the set of: gneiss, marble, quartzite, slate, schist, serpentine, amphibolite, hornfels, novaculite, phyllite and soapstone.

6. The process of claim 2, wherein the powdery substance comprises concrete, asphalt, pavement or waste rock.

7. The process of claim 2, wherein the powdery substance comprises recycled concrete, recycled asphalt, or recycled pavement.

8. The process of claim 1, wherein additives include both organic and inorganic compounds.

9. The process of claim 1, wherein granules of rock, sodium silicate solution and additives are combined forming a molecular bond and processed into pellets.

10. The process of claim 9, wherein the pellets are created using one or more processes that include extrusion forming, injection molding, thermoforming, vacuum forming, injection molding, stretching, blow molding, extrusion, blow molding, and rotational molding.

11. The process of claim 9, further comprising the step of melting the pellets and then stretching them into thin sheets with an average thickness of 0.14 mm.

12. The process of claim 11, further comprising the step of cutting the sheets into various sizes.

13. The process of claim 9, further comprising the step of adding vitamin powder to the mineral preparation; and further comprising the step of cutting the sheets into various sizes.

14. The process of claim 13, wherein igneous rocks are selected from the set of: dolostone, basalt, granite, gabbro, andesite, diorite, obsidian, pegmatite, peridotite, pumice, rylolite, and scoria.

15. The process of claim 13, wherein sedimentary rocks are selected from the set of: limestone, sandstone, conglomerate, shale, siltstone, brecca, gypsum, chert, travertine, flint, iron ore, rock salt, and oil shale.

16. The process of claim 13, wherein different metamorphic rocks are selected from the set of: gneiss, marble, quartzite, slate, schist, serpentine, amphibolite, hornfels, novaculite, phyllite and soapstone.

17. The process of claim 13, wherein the powdery substance comprises concrete, asphalt, pavement or waste rock.

18. The process of claim 13, wherein the powdery substance comprises recycled concrete, recycled asphalt, or recycled pavement.

19. The process of claim 13, wherein the vitamin powder is Vitamin B powder.

20. The process of claim 13, wherein the vitamin powder is inositol powder.

\* \* \* \* \*